United States Patent [19]

Palloch et al.

[11] 4,289,962
[45] Sep. 15, 1981

[54] OPTOELECTRONIC SYNCHRO GENERATOR

[75] Inventors: Herbert Palloch, Schwetzingens; Hans Erndt, Wiesloch, both of Fed. Rep. of Germany

[73] Assignee: Frankl & Kirchner GmbH & Co. KG, Schwetzingen, Fed. Rep. of Germany

[21] Appl. No.: 68,794

[22] Filed: Aug. 22, 1979

[30] Foreign Application Priority Data

Aug. 30, 1978 [DE] Fed. Rep. of Germany ....... 2837743

[51] Int. Cl.³ ............................................... G01D 5/34
[52] U.S. Cl. .......................... 250/231 SE; 250/237 G
[58] Field of Search ............ 250/239, 231 SE, 237 G; 340/347 P; 356/395, 396; 324/175

[56] References Cited
U.S. PATENT DOCUMENTS 3,693,023  9/1972  Wasserman ........................ 324/175
3,995,156  11/1976  Angersbach et al. ........ 250/231 SE
4,184,071  1/1980  Fryer et al. ..................... 250/237 G

*Primary Examiner*—David C. Nelms
*Attorney, Agent, or Firm*—Sprung, Felfe, Horn, Lynch & Kramer

[57] ABSTRACT

An optoelectronic synchro generator which comprises at least one photoelectric circuit element which includes a light source and an associated receiver. A rotatable shaft has mounted thereon, for rotation therewith, elements which define at least one optically effective surface spaced from the axis of rotation of the shaft and through which light coming from the light source impinges on the receiver when the surface is in a predetermined position during the rotation of the shaft. A removable cover covering the shaft and the photoelectric circuit element and a shield disposed between the receiver and the optically effective surface prevents the impingement of stray light on the receiver when the cover is removed.

11 Claims, 7 Drawing Figures

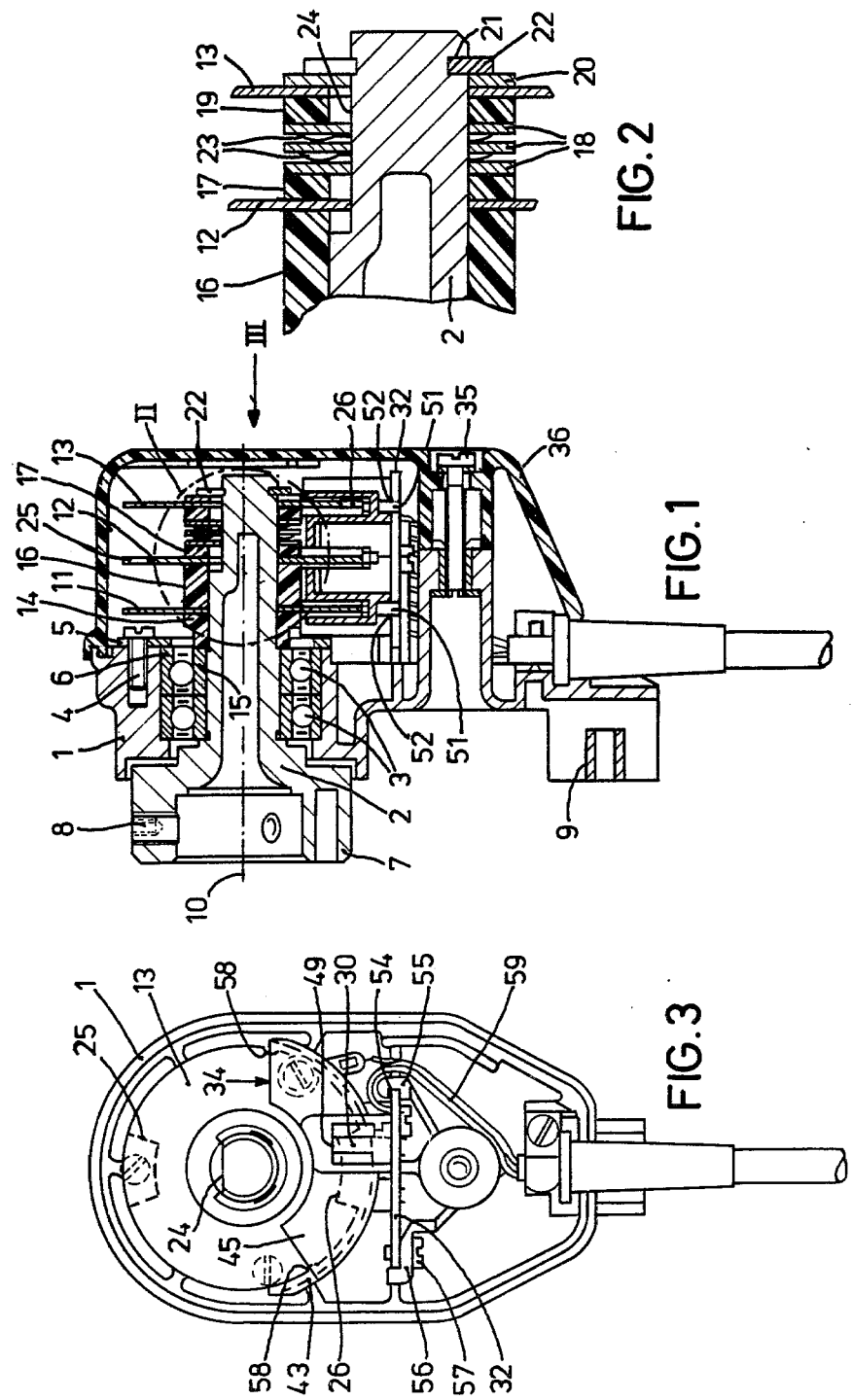

OPTOELECTRONIC SYNCHRO GENERATOR

BACKGROUND OF THE INVENTION

The invention relates to an optoelectronic synchro generator having at least one photoelectric circuit element consisting of a light source and a receiver and a removable cover.

Such prior-art synchro generators are used primarily with industrial sewing machines for the generation of signals representing specific needle positions whereby the sewing machine may then be stopped in such positions, such as needle down or needle up, and further operations such as threat cutoff may be initiated.

In such a synchro generator ("synchronizer") known, for example, from U.S. Pat. No. 3,683,294, the positioning of the parts carrying the optically effective surfaces requires the removal of a cover. In order that the sensitivity of the receivers not be impaired, adjustment must not take place in broad daylight or directly exposed to the light of a lamp illuminating a work position. This complicates positioning considerably.

The same problems arise with a synchro generator known from East German Pat. No. 52,049 where the top shaft of a sewing machine carries a cup-shaped part which serves as shutter and has at least one aperture. A light source projects into the cup-shaped part. Disposed radially relative to the cup-shaped part are receivers which form a part of an electric circuit. As the cup-shaped part revolves, a light beam impinges on one of the photoelectric receivers, thus generating a signal representing the position of the aperture, and hence the angular position of the shaft. The two photoelectric receivers are adapted to be displaced on their carriers, and the angular positions of the shaft represented by signals therefore are variable. Here, too, the receivers are fully exposed to stray light once a cover has been removed. Yet it is exactly for such adjustments that the operator needs good light.

SUMMARY OF THE INVENTION

The invention thus has as its object to improve a synchro generator of the aforementioned type in such a way that adjustments can be made in strong light.

In accordance with the invention, this object is accomplished by a shield disposed in front of the receiver. The minimum shielding provided according to the invention prevents the direct incidence of stray light on the receiver, thus permitting adjustments to be made in good light with the cover removed.

Through the measures according to another feature, particularly extensive shielding is provided in the area of the one or more photoelectric circuit elements. It not only prevents the incidence of stray light on the receiver but also largely eliminates the possibility of light falling on the receiver through single or multiple reflection. A particularly advantageous design of such an effective shielding member is also described hereinafter.

Through the characteristics of a further feature, assembly of the photoelectric circuit element and shielding member is facilitated without stray light being able to enter at the point of penetration of the photoelectric circuit element and shielding member.

The characteristics of another embodiment define a particularly advantageous design in which the light source and receiver are constructed as a fork-type photoelectric circuit, with the circular path of the adjustable part with the optically effective surface extending between light source and receiver. Here the light source and the receiver are both disposed in appropriate cutouts in the associated side walls of the shielding member. The measures according to the invention make possible a particularly simple mounting of the shielding member. Since the passing of the optically effective surface into the path of the light beam of the photoelectric circuit is not apparent to the operator, means are provided which permit precise adjustment without the operator being able to visually determine the position of the optically effective surface relative to the light beam.

BRIEF DESCRIPTION OF THE DRAWINGS

Further advantages and characteristics of the invention will become apparent from the following description of an embodiment illustrated in the drawing, wherein:

FIG. 1 is a vertical longitudinal section through a synchro generator according to the invention;

FIG. 2 is a fragmentary view of FIG. 1 according to the dot-dashed circle II in FIG. 1;

FIG. 3 is a top plan view of the synchro generator from the direction indicated by the arrow III in FIG. 1, with the cover removed;

DESCRIPTION OF THE INVENTION

Figure 4:
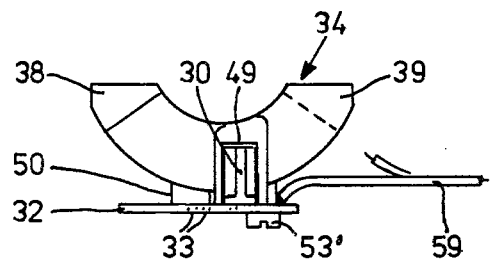
FIG. 4 is a side elevation of the shield, mounted together with photoelectric circuit elements on a circuit board, corresponding to the view of FIG. 3.

On the base plate 1 of a synchro generator, a shaft 2 is supported in antifriction bearings 3 without axial or radial play. For this purpose, a retaining ring 5 fastened to the base plate 1 by means of screws 4 bears on the outer ring 6 of the adjacent antifriction bearing 3. At the end which projects from the synchro generator, the shaft 2 comprises an integral coupling sleeve 7 whereby it can be connected to a corresponding coupling member (not shown) on the top shaft of a sewing machine for synchronous rotation therewith. To secure such coupling, a plurality of setscrews 8 are provided on the coupling sleeve 7.

Spaced from the shaft 2, and in the embodiment illustrated below the shaft 2, there is provided on the base plate 1 a detent member 9 which engages a complementary detent member fixed to the upper part of the sewing machine so as to secure the base plate 1, and hence the entire synchro generator, against turning about the axis 10 of the shaft 2 relative to the upper part of the sewing machine.

Mounted on the shaft 2 in its portion remote from the coupling sleeve 7 are three disks, namely, a pulse-generator disk 11 and two positioning disks 12 and 13. The disk nearest the antifriction bearings 3, i.e., the pulse-generator disk 11, is supported on a spacer sleeve 14 relative to the inner ring 15 of the associated antifriction bearing 3. A further spacer sleeve 16 is disposed between the pulse-generator disk 11 and the adjacent positioning disk 12. The two sleeves 14 and 16 are made of a suitable plastics material such as polyethylene.

On the other side, a brake disk 17 made of a friction-lining-like material such as pressed cork, and a support disk 18 nonrotatably mounted on the shaft 2, bear on the positioning disk 12. Spaced slightly from said support disk and from each other are two further similar support disks 18, which are followed by another brake disk 19 similar to the brake disk 17. Thereagainst bears a third disk, i.e., the positioning disk 13. A washer 20 bears on the positioning disk 13 from the other side. The entire assembly is held together by a retaining ring 22, such as a Seeger lock ring, disposed in an appropriate groove 21 at the inner end of the shaft 2. Disposed between every two adjacent support disks 18 are, as is apparent particularly from FIG. 2, spring washers 23 of the cup-spring or corrugated-spring type which through the outer support disks 18 adjacent to the corresponding brake disks 17 and 19, respectively, urge the latter against the corresponding positioning disks 12 and 13, respectively, each of which abuts squarely on the other side. This provides for frictional engagement between the positioning disks 12 and 13 and the adjacent support disks 18. The support disks 18 are nonrotatably mounted on the shaft 2, the latter comprising over that portion an unround section with a circumferential area 24 milled flat. The support disks are provided with an inside opening conforming thereto and therefore are unable to turn relative to the shaft 2. The design and mode of operation of this mount are described in detail in German patent application No. DAS 17 63 859, to which reference is made. This mode of mounting the disks in frictional engagement permits precise tangential and hence peripheral positioning, in other words, fine adjustment of the angular position of the disks relative to the shaft 2, without impairment of their position, secured against rotation and axially fixed, during operation.

Each of the two positioning disks 12 and 13 has as an optically effective surface slots 25 and 26, respectively, disposed in the peripheral area. The slot 25 in positioning disk 12 and the slot 26 in positioning disk 13 are indicated by dashed lines in FIG. 3. The pulse-generator disk 11 comprises a multiplicity of angular equidistant slots (not shown in the drawing). For example, there may be 120 slots spaced 3 degrees apart. The rotative speed of the shaft 2, and hence the rotative speed of the top shaft of the sewing machine, are determined digitally by means of the pulse-generator disk 11 while specific angular positions of the top shaft of the sewing machine, and hence of the needle bar or needle, are determined by means of the positioning disks 12 and 13.

For this purpose, three photoelectric circuit elements 27, 28 and 29 are provided which are alike and each of which consists of a light source 31 in the form of a light-emitting diode and a receiver 30 in the form of a photodiode. These photoelectric circuit elements 27, 28 and 29 are of the fork type, being approximately U-shaped, with the light source 31 accommodated in one leg and the receiver 30 in the other. Such photoelectric circuit elements are commercially available. These three photoelectric circuit elements 27, 28 and 29 are mounted on a printed-circuit board 32 in the usual manner, their leads being run through appropriate holes 33 in the circuit board 32 and soldered on its underside.

Also mounted on the circuit board 32 is a shield 34 intended to protect in particular the receivers 30 against incident stray light, for example, when a cover 36 which is removably fastened to the base plate 1 by means of a screw 35 is removed for adjustment of the positioning disk 12 or 13.

Shield 34 consists of a shielding member 37, 38 and 39 for each disk 11, 12 and 13. These shielding members have approximately the cross section of a sector of a circle, as is apparent from FIGS. 3 and 4. Each has side walls 40 and 41, 42 and 43, and 44 and 45 having the form of a sector of a circle, which are paired by means of a wall 46, 47 and 48, respectively, having the shape of a section of a cylinder, so that the side walls 40 and 41, 42 and 43, and 44 and 45 forming shielding members 37, 38 and 39, respectively, with the associated walls 46, 47 and 48 have slots in the form of a section of a cylinder in which a portion of the particular disk 11, 12 or 13 associated therewith is disposed. The side walls 40 to 45 extend radially nearly all the way to the spacer sleeves 14 and 16, the brake disks 17 and 19, and the washer 20, respectively.

Figure 6:
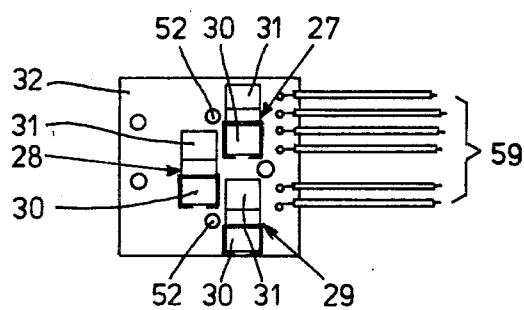
FIG. 6 is a top plan view of the circuit board with photoelectric circuit elements corresponding to the view of FIG. 5 but with the cover removed.
Figure 7:
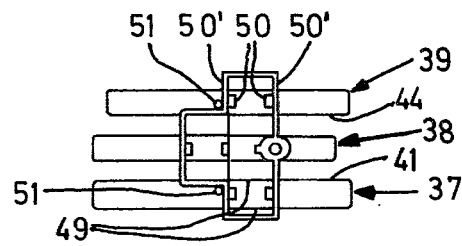
FIG. 7 is an underneath view of the shield.

As is apparent from FIG. 6, the two outer photoelectric circuit elements 27 and 29 are aligned with each other while the middle photoelectric circuit element 28 is mounted on the circuit board 32 laterally offset relative to the other two. Each of the six side walls 40 to 45 of the shielding members 37 to 39 has a cutout 49 into which the light source 31 and the receiver 30, respectively, of each photoelectric circuit element 27, 28 and 29 fit. These cutouts are radially open downwardly so that the shielding members 37, 38 and 39 may be slipped from above over the photoelectric circuit elements 27, 28 and 29 after the latter have been mounted on the circuit board 32. To permit the shield 34 to be centered relative to the photoelectric circuit elements 27, 28 and 29 in the direction of the axis 10, centering stops 50 are provided which fit precisely between the light source 31 and the receiver 30 of every photoconductive circuit element 27, 28 and 29, respectively. (See FIG. 7.)

The three shielding members 37, 38 and 39 are combined into a unit by walls 50' which in the direction of the axis 10 interconnect the shielding members 37, 38 and 39, are arranged approximately in the form of a T (see FIG. 7), are aligned with the cutouts 49, rest all around on the circuit board 32, center the shield perpendicularly to the axis 10, and form a kind of housing for the photoelectric circuit elements so that the middle photoelectric circuit element 28 which is laterally offset relative to the two others is completely enclosed within these walls 50' while of the two outer photoelectric circuit elements 27 and 29 either the light source 31 or the receiver 30 is so enclosed. The unit as a whole forms the shield 34. It comprises two downwardly projecting centering pins 51 which drop into appropriate holes 52 as the shield 34 is set onto the circuit board 32, the position of the shield 34 relative to the circuit board 32, and hence relative to the photoelectric circuit elements 27, 28 and 29 on the circuit board, thus being precisely fixed. The shield 34 is held to the circuit board 32 by a screw 53' which passes through the board from below and engages a bore 53 in the shield 34.

The circuit board is set into a groove 54 in a fillet 55 by an edge extending parallel to the axis 10. At the other end it is also seated on a fillet 56, to which it is fastened by at least one screw 57. In the vicinity of the edge which is set into the groove 54 in the fillet 55, leads 59 are attached for the photoelectric circuit elements 27, 28 and 29 which are mounted on the circuit board 32.

Figure 5:
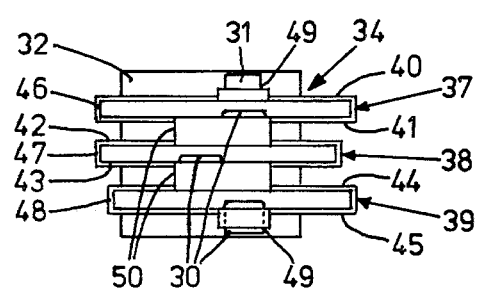
FIG. 5 is a top plan view of the shield according to FIG. 4.

As may be seen from FIGS. 3, 4 and 5, the two shielding members 38 and 39 associated with the positioning disks 12 and 13 are displaced relative to each other approximately by the angle by which the two associated photoelectric circuit elements 28 and 29 are angularly displaced relative to each other, referred to the axis 10, so that each photoelectric element 28 and 29 is located approximately in the vicinity of the angle bisector of the associated shielding member 38 and 39, respectively. Each of the two positioning disks 12 and 13 is provided on its periphery with two marker notches 58 whose angular spacing is identical with the angle of coverage of the associated shielding member 38 and 39, respectively, as is apparent from FIG. 3. When the associated disk 12 or 13, respectively, is positioned so that these two marker notches 58 are located exactly at the beginning or end of the associated side walls 44 and 45 or 42 and 43, respectively, then the associated slot 26 or 25 is precisely in the position in which it can be penetrated by the beam of light directed by the particular light source 31 to the associated receiver 30, said beam then impinging on the particular receiver 30 to produce a signal representing the angular position of that disk. Because of the described angular displacement of the two shielding members 38 and 39, respectively, the disks 12 and 13 with their particular slots 25 and 26, respectively, and their marker notches 58 can be constructed absolutely identically. To set a particular disk 12 or 13 to a desired position, it is arrested in the position illustrated in FIG. 3 in which the two marker notches 58 are aligned with the edges of the associated shielding member 38 or 39, respectively, and the shaft 2 is rotated by overcoming the friction between the disks 11 and 12 on the one hand and the brake disks 17 and 19 on the other hand. In the case of a sewing machine, for example, this is done by turning the handwheel seated on the top shaft of the sewing machine until the needle bar with the needle is in the lower or upper position to which a signal is to be assigned that is generated as the corresponding slot 25 or 26 passes into the path of the light beam of the corresponding photoelectric circuit element 28 or 29. The shielding members 37, 38 and 39 cover the photoelectric circuit elements 27 to 29 so completely that the latter cannot foul.

In place of the arrangement described, in which the light beam emitted by a light source 31 impinges directly on the associated receiver 30 when a window or slot passes through said beam, commercial reflected-light photoelectric systems might be used in which light source and receiver are disposed more or less side by side and the light beam is directed to the receiver and there triggers a signal when a reflecting member intercepts the light beam. In that case, there would be no need for solid disks to take the place of the positioning disks 12 and 13; rather, small reflecting vanes or the like joined to the shaft through an arm would then suffice. However, the construction of the entire shield 34 would be substantially the same.

As is apparent from FIG. 5, the insides of the particular light source 31 or receiver 30 directed toward the particular disks 11, 12 or 13, respectively, are approximately flush with the inside of the side walls 41, 43 and 45 or 40, 42 and 44, respectively.

The shield 34 is made of a black plastics material with a dull surface in order that the reflection of light may be reduced to an insignificant level.

The angle of coverage of the shielding members 37, 38 and 39 is at least 90 degrees. For production reasons, it is not larger than 180 degrees.

It will be appreciated that the instant specification and claims are set forth by way of illustration and not of limitation, and that various modifications may be made without departing from the spirit and scope of the present invention.

What is claimed is:

1. An optoelectronic synchro generator comprising at least one photoelectric circuit element, each including a light source and an associated receiver; a rotatable shaft; means mounted on the shaft both for normal rotation therewith and for selective adjusting rotation with respect thereto for defining at least one optically effective surface spaced from the axis of rotation of the shaft by which light coming from the light source impinges on the receiver when said surface is in a predetermined position during the rotation of said shaft; a removable cover which covers the shaft and the photoelectric circuit element; at least one shielding means disposed at least in front of the receiver, but behind the path of the means defining the optically effective surface when viewed from the receiver, for permitting light from the source to impinge on the receiver when the surface is in the predetermined position and for preventing the impingement of stray light on the receiver when the cover is removed.

2. A synchro generator according to claim 1, wherein the shielding means comprises shielding members which extend on both sides of the means defining each optically effective surface and on both sides of each photoelectric circuit element over a portion of the circular path of said surface.

3. A synchro generator according to claim 2 in which said means defining at least one optically effective surface comprises a positioning disk with a light penetrable section, the positioning disk having marker notches on its periphery whose angular spacing from each other is equal to the angle of coverage of the associated shielding member.

4. A synchro generator according to claim 3 wherein at least one side wall of each shielding member comprises a radially outwardly open cutout to receive one photoelectric circuit element.

5. A synchro generator according to claim 4, wherein each photoelectric circuit element comprises a fork-type photoelectric circuit element having a light source and a receiver disposed opposite each other, the circular path of the optically effective surface extending between the light source and receiver, and the cutout comprises one cutout for the light source in one of the side walls and another cutout for the receiver in the other side wall of the associated shielding member.

6. A synchro generator according to claim 3, further comprising a printed circuit board on which the photoelectric circuit elements and the associated shielding members are mounted.

7. A synchro generator according to claim 6 further comprising centering pins on the shielding members and bores in the circuit board for receiving centering pins.

8. A synchro generator according to claim 2 wherein the shielding member are all of one-piece construction.

9. A synchro generator according to claim 3 in which at least one means defining an optically effective surface is a positioning disk with a light penetrable section the positioning disk having marker notches on its periphery whose angular spacing from each other is equal to the angle of coverage of the associated shielding member.

10. A synchro generator according to claim 2 wherein each shielding member comprises a black plastic material with a dull surface.

11. A synchro generator according to claim 3 wherein the angle of coverage of each shielding member is greater than 90 degrees, but smaller than 180 degrees.

* * * * *